Jan. 23, 1940.  W. JOHANNES ET AL  2,187,818
DIALYZING APPARATUS
Filed April 13, 1937
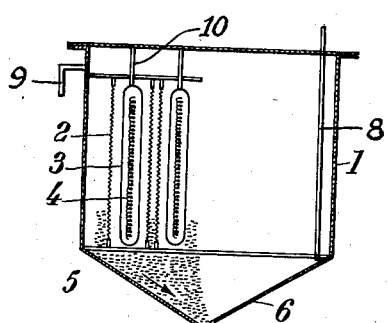
Fig. 1
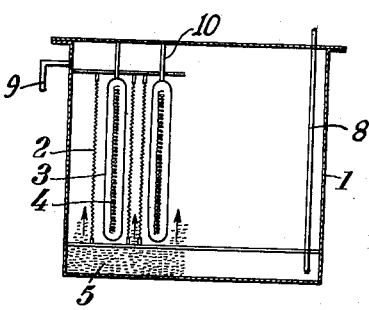
Fig. 2
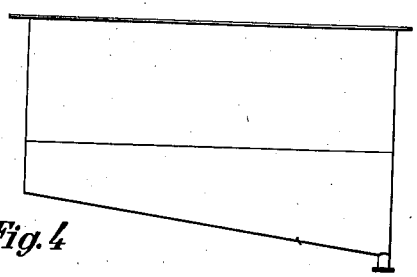
Fig. 3
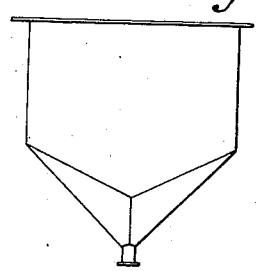
Fig. 3a
Fig. 4
Fig. 4a
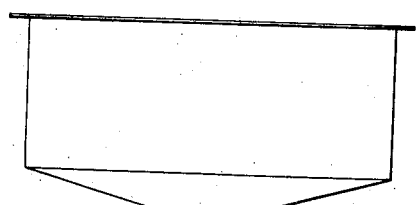
Fig. 5
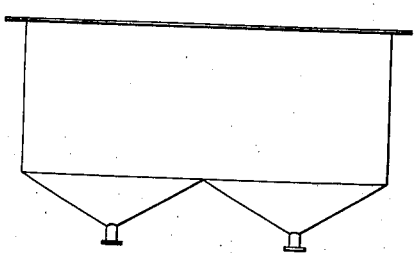
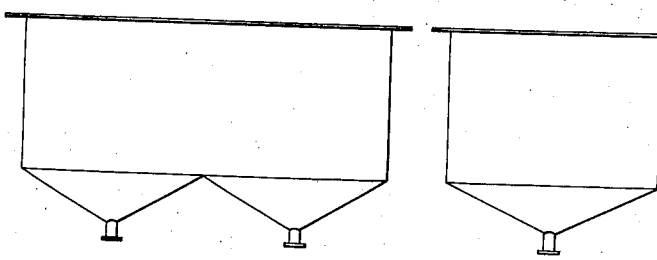
Fig. 5a
Walter Johannes
Walther Zetzsche  Inventors
By Their Attorneys Patented Jan. 23, 1940

2,187,818

UNITED STATES PATENT OFFICE 2,187,818

DIALYZING APPARATUS

Walter Johannes and Walther Zetzsche, Premnitz, Westhavelland, Germany, assignors to I. G. Farbenindustrie Aktiengesellschaft, Frankfort-on-the-Main, Germany Application April 13, 1937, Serial No. 136,700
In Germany April 29, 1936

4 Claims. (Cl. 23—252)

Our present invention relates to an apparatus for dialyzing liquids.

The principal object of our invention is a dialyzing apparatus of improved construction. Further objects will be seen from the detailed specification following hereafter.

In the dialysis of liquids which contain both colloids and crystalloids in solution the colloids chiefly separate from the solution as the dialysis progresses. In the dialysator the colloid settles at the bottom of the vessel in the form of mud. During the progress of the dialysis the level of this extremely voluminous mud rises higher and higher in the vessel and finally attains the level of the dialysis membrane and hinders the diffusion of the solution. In the technical application of dialysis, for instance in dialyzing caustic soda lyes containing hemi-cellulose, this separation of the colloids from the solution disturbs considerably the dialysis.

The apparatus for dialysis according to our invention is so constructed that the mud can easily be removed from the dialysator during the dialysis. For this purpose the bottom surface of the dialyzing vessel which has hitherto been horizontal is constructed with an inclination to one or more outlets or in the form of one or more funnels. The outlet or outlets are preferably closed by a valve or slide. From these outlets the mud can be allowed to flow without interrupting the operation of dialysis so that the dialyzing surface remains fully active.

Reference is made to the accompanying drawing.

Figures 1, 3, 4 and 5 represent preferred embodiments of our present invention, while Figure 2 shows the ordinary dialyzing apparatus with flat bottom surface.

In Figures 1 and 2 1 is the outer wall of the dialyzing vessel, 2 is the supporting frame of the dialyzing membrane, 3 is the membrane itself and 4 is the wire netting which serves to prevent the two membrane surfaces from coming into contact with each other. 5 indicates mud which collects at the bottom of the vessel and in Figure 1 6 indicates the sloping bottom part and 7 the outlet. The liquid to be dialyzed is supplied to the bottom of the vessel by means of the supply pipe 8 and is discharged from the vessel through the pipe 9. The dialyzing liquid or water is supplied between the dialyzing membranes 3 through inlets 10 whereupon the dialyzing liquid flows downwardly in countercurrent to the liquid to be dialyzed and is eventually discharged through suitable outlets arranged adjacent the bottom of the dialyzing membrane. The details of this portion of the apparatus are not illustrated in the drawing since they are conventional and not a part of the present invention.

Figures 3, 4 and 5 are modifications of our invention which are self-explanatory.

Figures 3, 4 and 5 are front elevations of various modifications according to this invention, while Figures 3a, 4a and 5a are end elevations of corresponding dialyzing vessels.

The angle of inclination for the bottom surface must be steep, that is to say so great that there is the best possible slide surface for the mud. The effect is good when, for example, the slide surface forms an angle of 22.5° to the horizontal. The bottom of the vessel may either be inclined as a whole towards one side or its surface may be subdivided into several areas and these may each incline at a suitable gradient towards one or more outlets.

This new construction of the dialyzing apparatus offers a considerable advance over the generally used apparatus having a horizontal bottom. The separated colloid withdrawn during the operation may obviously be freed by filtration from liquids still adhering to it and then returned for further dialysis. The invention is of special advantage when the product to be won is the separated colloid, but it is also very advantageous in other cases, for example in the continuous purification of spent lye such as is obtained in the mercerizing of cellulose.

What we claim is:

1. In an apparatus for dialyzing liquids, a tank for containing the liquid to be dialyzed, a plurality of dialyzing membranes forming a plurality of chambers arranged in said tank and containing a dialyzing liquid, an inclined bottom on said tank, said membranes and chambers being so located in said tank as to afford clear spaces for the downward passage of colloidal particles separating during dialysis and a clear space in the bottom of said tank, said bottom being so inclined as to collect said particles for convenient removal.

2. In an apparatus for dialyzing liquids, a tank for containing the liquid to be dialyzed, a plurality of dialyzing membranes forming a plurality of chambers arranged in said tank and containing a dialyzing liquid, a funnel shaped bottom on said tank, said membranes and chambers being so located in said tank as to afford clear spaces for the downward passage of colloidal particles separating during dialysis and a clear space in the bottom of said tank, said funnel-shaped bottom being so inclined as to collect said particles for convenient removal, and an outlet arranged at the end of said funnel-shaped bottom.

3. In an apparatus for dialyzing liquids, a tank for containing the liquid to be dialyzed, a plurality of dialyzing membranes forming a plurality of chambers arranged in said tank and containing a dialyzing liquid, the bottom on said tank being inclined as a whole to one side, said membranes and chambers being so located in said tank as to afford clear spaces for the downward passage of colloidal particles separating during dialysis and a clear space in the bottom of said tank, said bottom being so inclined as to collect said particles for convenient removal, and an outlet arranged at the base of the inclined bottom.

4. In an apparatus for dialyzing liquids, a tank for containing the liquid to be dialyzed, a plurality of dialyzing membranes forming a plurality of chambers arranged in said tank and containing a dialyzing liquid, an inclined bottom on said tank, said membranes and chambers being so located in said tank as to afford clear spaces for the downward passage of colloidal particles separating during dialysis and a clear space in the bottom of said tank, said bottom being inclined at an angle of about 22.5° to the horizontal so as to collect the separated particles for convenient removal, and an outlet arranged at the lower end of the incline.

WALTER JOHANNES.
WALTHER ZETZSCHE.